May 24, 1960
R. C. NORRIE
2,937,881
STEERING MECHANISM FOR TILTING CAB
Filed Jan. 24, 1958
2 Sheets-Sheet 1
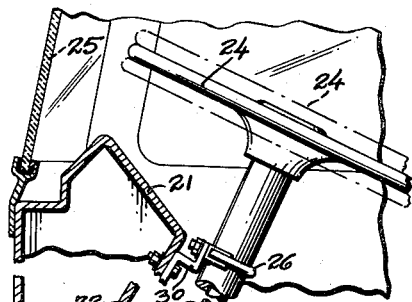
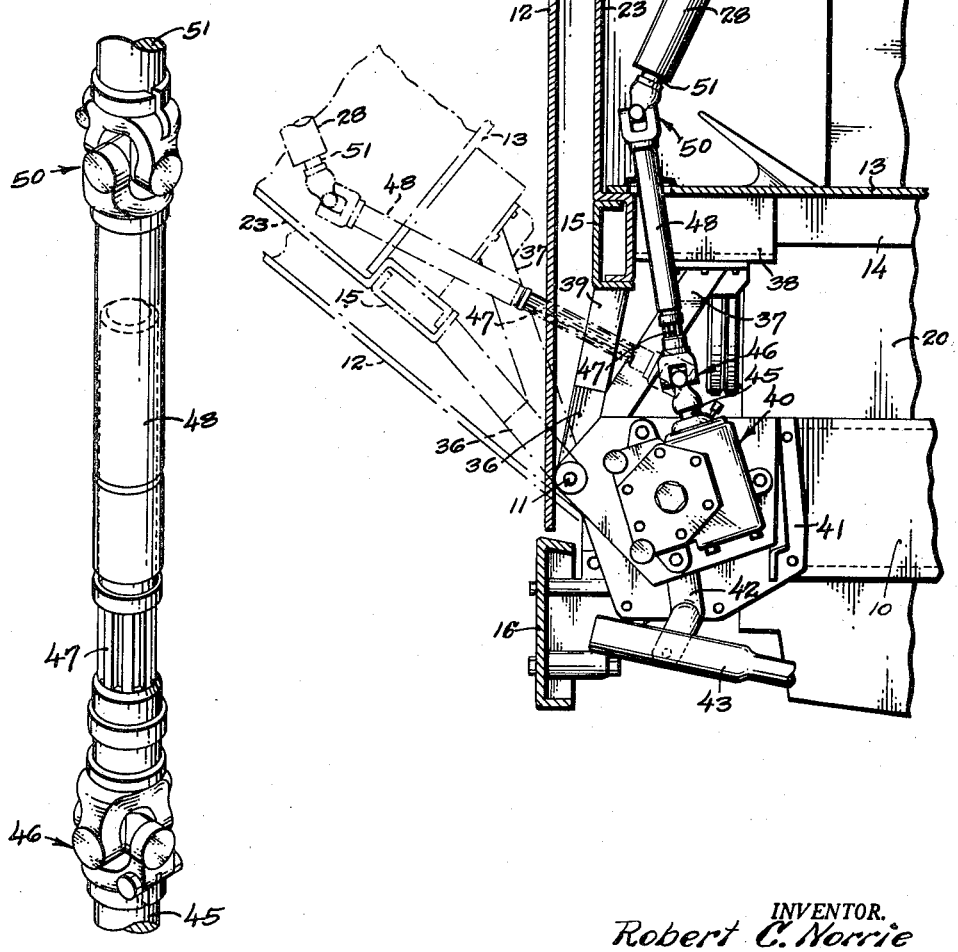
INVENTOR.
Robert C. Norrie
BY
Barnes & Seed
attys.

May 24, 1960  R. C. NORRIE  2,937,881
STEERING MECHANISM FOR TILTING CAB
Filed Jan. 24, 1958  2 Sheets-Sheet 2

INVENTOR.
Robert C. Norrie
BY
Barnes & Seed
attys.

US United States Patent Office 2,937,881
Patented May 24, 1960

2,937,881
STEERING MECHANISM FOR TILTING CAB

Robert C. Norrie, Seattle, Wash., assignor to Pacific Car and Foundry Company, Seattle, Wash., a corporation of Washington Filed Jan. 24, 1958, Ser. No. 710,894

1 Claim. (Cl. 280—87)

This invention relates to motor trucks of the type in which the engine of the truck is located below the cab and the cab tilts forwardly to give access to the engine. The present invention pertains especially to the steering mechanism and for its principal object aims to provide a steering mechanism which permits the reduction gear subassembly to be fixedly mounted upon the vehicle frame, and the steering wheel to be fixedly mounted within the cab, while providing between such wheel and the subassembly a connection which automatically compensates itself to movement of the cab as the latter is tilted from a normal lowered position into and out of a raised position.

The invention has the further particular object of providing a steering connection having the function, in addition to said automatic compensation for the cab's tilting motions, of accommodating vertical adjustments given the steering wheel in locating the latter for the maximum comfort of the driver.

With the above objects and advantages in view and further aiming to provide a dependable and rugged steering connection for the purpose described, the invention consists in the novel construction and in the adaptation and combination of parts hereinafter described and claimed.

In the accompanying drawings:

Figure 1 is a fragmentary view partly in side elevation and partly in longitudinal vertical section portraying an automotive truck having a tilting cab and incorporating a steering assembly constructed to embody the preferred teachings of the present invention. Said cab, the vehicle frame, and the steering mechanism are shown by full lines in the normal lowered position of the cab while phantom illustration is employed to portray said cab and steering mechanism in the forwardly tilted position of the cab.

Fig. 3 is a fragmentary perspective view illustrating the tilt-compensating connection between steering wheel and the reduction gear subassembly, employing a scale enlarged from that of the preceding views.

Figure 2:
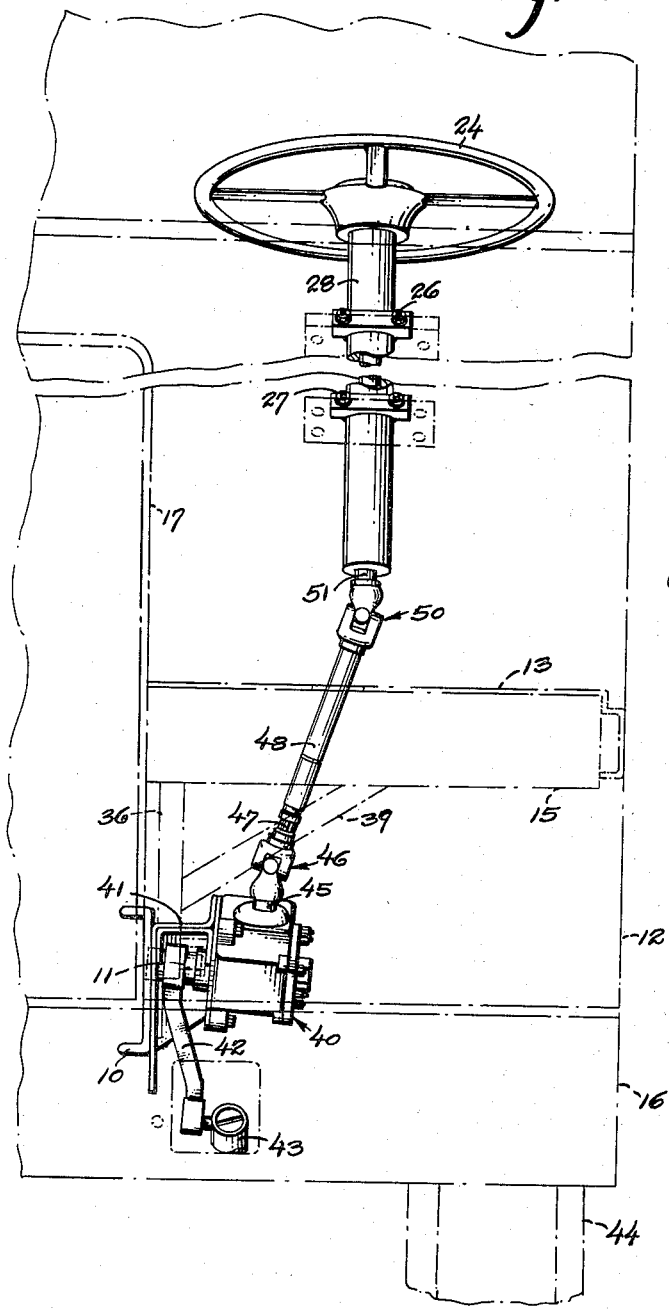
Fig. 2 is a fragmentary front elevational view of said steering mechanism and with the cab portrayed by broken lines.
Figure 4:
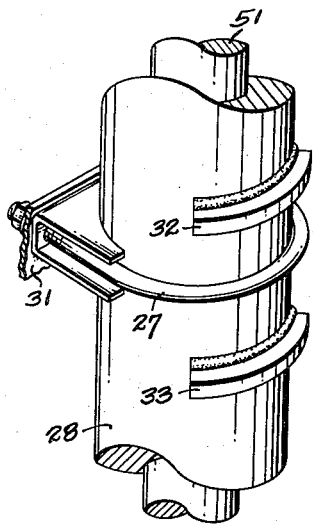
Fig. 4 is a fragmentary perspective view drawn to a yet larger scale and detailing one of two shackling U-bolts for clamping the steering column in vertically adjusted positions.

The chassis of the truck to which the tilting cab and steering mechanism of the present invention is applied is or may be conventional, and there is no need to here illustrate more than the frame which is shown as including the usual longitudinal channels 10.

A bumper 16 is fixedly attached to such frame channels so as to occupy a position somewhat below and moderately to the front of the same, and there is also fixedly attached to each channel, at the extreme front end thereof, a respective bracket carrying one of two co-axial trunnion shafts 11. The cab, which is tipped forwardly by a hydraulic ram or rams (not shown) about the center of these trunnion shafts as an axis, has the usual or a suitable shape with panels, as 12, skirting the front, back and both sides, and having a floor 13 raised well above the lower edge of said panels and deriving its support from a frame which is fabricated from longitudinal and transverse members 14 and 15, respectively. Two of such transverse members lie immediately to the rear of the front panel, one on one side and the other on the other side of a jump 17 which overlies the engine 20. There is provided an inner front wall for the cab at each side of said jump rising vertically from the transverse frame members. Provided at the driver's side of the cab is a sloped instrument panel 21 joined by an inclined shoulder section 22 with the concerned section 23 of said two inner front walls. The numeral 24 denotes a steering wheel mounted by U-bolts 26 and 27 which shackle the steering column 28 to brackets 30 and 31 which are secured to the inclined shoulder walls 22. The vertical adjustment given to such wheel is confined within a range determined by upper and lower limit stops 32 and 33 welded to said steering column.

The connection from each of the trunnions 11 to the cab is obtained by a respective tripodal standard invertedly mounted so that the head lies at the bottom, the trunnions being carried by said head. Two of the legs rise one to the front of the other the other parallel with a vertical plane traversing the longitudinal median line of the vehicle, with the front leg 36 welded by its upper end to the inner end of the frame member 15 and with the rear leg 37 bolted to a bracket 38 welded to the inside frame member 14. The third leg 39 of the tripodal standard lies in the transverse vertical plane of the leg 36, extending diagonally outwardly with its upper end welded to said frame member 15.

Now considering the reduction gear subassembly for the vehicle's steering mechanism, there is provided below the cab at the left side thereof, and namely at the side having the steering wheel 24, a gear box 40 which is rigidly secured to a bracket 41 carried by the vehicle's main frame. This bracket 41 is or may be the same bracket which carries the related trunnion shaft 11, being illustrated as having an inverted U-shape in end elevation with the gear box bolted to the outside face and having the trunnion shaft journaled at the extreme front end between the two legs of the U. The gear box contains the usual worm together with a worm-toothed sector gear, and responding to the movements of the sector gear is a pitman arm 42 likewise journaled between the two legs of the U so that its free end depends and partakes of a fore-and-aft movement about a transverse horizontal axis. From the free end of the pitman arm a drag-link 43 extends longitudinally of the vehicle and connects through a ball joint with a steering arm (not shown) for the left front road wheel 44. The customary tie-rod (not shown) extends from the steering arm of said left front road wheel to the steering arm of the right front road wheel.

A stub shaft 45 carries steering movements to said worm of the gear box, and such stub shaft projects above the gear box whereat the same connects by a universal 46 with a male spindle section 47. This male spindle section finds a spline connection in a female spindle section 48. The female spindle section connects in turn by a universal 50 with a steering shaft 51 housed in the steering column 28. Said spline connection is such as will permit substantial endwise motion between the female section 48 and its mating section 47. The cab may thus be tilted forward into the broken-line position in which it is shown in Fig. 1 without necessitating disconnection of the subassembly from the steering shaft, nor requiring that the subassembly be displaced in any way from a preset working relationship with the steering arms of the front road wheels. Steering arrangements in which the gear box moves with the cab, relying upon the drag-link as a compensating couple, place destructive stress upon the pitman arm and the drag-link unless the steerable front wheels are positioned so as to exactly occupy a single given position within their range of turning motion. In the preferred design of the present tilting-cab truck, looking to maximum driver visibility, it will be seen that the floor of the cab lies well above the vehicle's main frame, and that the steering wheel, when the cab occupies its normal lowered position, is in close proximity of the cab's windshield. The result is that the steering wheel and the gear box lie in more or less the same transverse vertical plane, with the steering shaft 51 lying in angular relation to the splined sections 47—48. As an added function to the office of accommodating the steering connections to tilting motion of the cab, the spline also permits the steering column to be raised or lowered in setting the steering wheel at different heights within its permitted range of vertical adjustment. Considered self-evident, the lower of the two splined sections may, if desired, carry turning motions of the steering wheel to a power steering subassembly rather than to the worm, or functioning counterpart, of the indicated mechanical reduction gear subassembly.

It is thought that the invention will have been clearly understood from the foregoing detailed description of my now preferred illustrated embodiment. Changes in the details of construction will suggest themselves and I accordingly intend that no limitations be implied and that the hereto annexed claim be given the broadest interpretation which the employed language fairly permits.

What I claim is:

In an automotive vehicle, in combination with a vehicle main frame and steerable front road wheels mounted thereon, a cab mounted on the forward end of said frame for forward tilting movements, the tilt mounting comprising, at each side of the cab, a standard fulcrumed by its lower end to the main frame at the extreme front end thereof and having its upper end rigidly secured to the front end of a frame for the cab, a steering reduction gear box carried by the main frame to occupy a fixed position to one side of center closely spaced to the rear of the transverse vertical plane in which the fulcrum lie, a steering shaft with a steering wheel thereon supported within the cab for motion bodily therewith and occupying a position at the same side of center as the reduction gear box, means passing to the reduction gearing of the gear box steering motions given by the steering wheel to the steering shaft and comprising co-axially disposed vertical spindle sections coupled by a spline connection to permit relative endwise motion of said sections in compensation of vertical movement of the cab relative to the main frame with one of said spindle sections articulating by a universal joint with the steering shaft and the other spindle section articulating by a universal joint with a stub-shaft constituting the input to the reduction gearing of the gear box, and means for passing steering motions given to said reduction gearing of the gear box from said reduction gearing to the front road wheels, said steering structure being so located that when the cab occupies its normal lowered position, and considered in side elevation, the axes of the steering shaft, the splined spindles, and the stub-shaft are steeply inclined in each instance and with the steering shaft pointing forwardly from the steering wheel, the spindles pointing rearwardly from the steering shaft, and the stub-shaft pointing rearwardly from the spindles.

References Cited in the file of this patent

UNITED STATES PATENTS

| | | |
|---|---|---|
| 1,791,001 | Rasmussen | Feb. 3, 1931 |
| 2,376,491 | Kinney | Feb. 1, 1943 |
| 2,469,075 | Paun | May 3, 1949 |
| 2,624,478 | Kaplan | Jan. 6, 1953 |
| 2,716,032 | Barenyi | Aug. 23, 1955 |
| 2,740,487 | Murty et al. | Apr. 3, 1956 |
| 2,798,568 | Zeller | July 9, 1957 |
| 2,865,222 | Bachman | Dec. 23, 1958 |

FOREIGN PATENTS

| | | |
|---|---|---|
| 1,124,683 | France | July 2, 1956 |
| 816,637 | Germany | Oct. 11, 1951 |